(12) United States Patent
Wellbrock et al.

(10) Patent No.: US 8,433,190 B2
(45) Date of Patent: Apr. 30, 2013

(54) HOT-SWAPPING IN-LINE OPTICAL AMPLIFIERS IN AN OPTICAL NETWORK

(75) Inventors: Glenn A. Wellbrock, Wylie, TX (US); Tiejun J. Xia, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 257 days.

(21) Appl. No.: 12/852,644

(22) Filed: Aug. 9, 2010

(65) Prior Publication Data

US 2011/0116786 A1    May 19, 2011

Related U.S. Application Data (63) Continuation-in-part of application No. 12/618,331, filed on Nov. 13, 2009.

(51) Int. Cl.
    *G02F 1/00*    (2006.01)
(52) U.S. Cl.
    USPC ............... 398/2; 398/3; 398/4; 398/5; 398/6; 398/11; 398/18; 398/33; 398/37; 398/38; 398/177; 398/181; 359/341; 359/337
(58) Field of Classification Search ............ 398/1, 2, 398/3, 4, 5, 6, 7, 10, 11, 12, 13, 16, 17, 18, 398/19, 20, 25, 26, 27, 33, 38, 177, 158, 398/159, 160, 181, 21, 30, 31, 32, 34, 37, 398/79, 173, 180; 359/341, 337, 334, 341.02
See application file for complete search history.

(56) References Cited

U.S. PATENT DOCUMENTS

| | | | | |
|---|---|---|---|---|
| 5,069,521 | A | * | 12/1991 | Hardwick ................... 385/24 |
| 8,027,585 | B2 | | 9/2011 | Yokoyama |
| 8,077,385 | B2 | * | 12/2011 | Yang et al. .................. 359/349 |
| 2008/0175587 | A1 | * | 7/2008 | Jensen ........................... 398/2 |
| 2010/0027989 | A1 | | 2/2010 | Lewis et al. |

OTHER PUBLICATIONS

"Flexible Fiber Optic Cross-Connection Management," Calient Networks, Inc., http://www.calient.com/applications/in_the_co.php, Copyright 2009, Retrieved from the internet on Nov. 16, 2009, 3 pages.
"Intelligent Optical Switches," Product Family Overview, Glimmerglass Networks, Inc., www.glimmerglass.com, Copyright 2009, Retrieved from the internet on Nov. 16, 2009, 2 pages.

(Continued)

*Primary Examiner* — Hanh Phan (57) ABSTRACT

An amplifier node, in an optical network, includes a first switch connected to a working path from which network traffic is received; a second switch connected to the working path to which the network traffic is transmitted; and two amplifiers that interconnect the first switch and the second switch, where the network traffic travels from the first switch to the second switch via a first amplifier. The amplifier node also includes a controller to receive an instruction to switch the network traffic from the first amplifier to a second amplifier that enables the first amplifier to be repaired; send, to the first switch and the second switch, another instruction to switch the network traffic from the first amplifier to the second amplifier; receive an indication that the network traffic is traveling via the second amplifier; and send a notification that the first amplifier can be repaired based on the indication.

22 Claims, 6 Drawing Sheets

OTHER PUBLICATIONS

"Optical Switch Modules," CrossFiber, Inc., http://www.crossfiber.com/products/index.html, Copyright 2009, Retrieved from the internet on Nov. 16, 2009, 1 page.

"Optical Switch Products," Polatis, Inc., http://www.polatis.com/products/index.asp, Copyright 2009, Retrieved from the internet on Nov. 16, 2009, 2 pages.

"Safety of laser products—Part 2: Safety of optical fibre communication systems (OFCS)," Webstore, International Electrotechnical Commision, http://webstore.iec.ch/webstore.nsf/artnum/032503, Abstract, Jun. 28, 2004, 1 page.

* cited by examiner

HOT-SWAPPING IN-LINE OPTICAL AMPLIFIERS IN AN OPTICAL NETWORK

RELATED APPLICATION

This application is a continuation-in-part of U.S. patent application Ser. No. 12/618,331, filed Nov. 13, 2009, the disclosure of which is incorporated herein by reference.

BACKGROUND

In-line optical amplifiers are used for high-speed optical communication and data transmission over short distances, such as for a local area network within a metropolitan area, as well as long distances, such as for a long haul optical network. In-line optical amplifiers ensure that network traffic, carried by optical signals via a network path (e.g., via fiber optic cables), are able to transit short or long distance optical networks. However, optical networks occasionally experience service interruptions due to faults associated with one or more in-line optical amplifiers due to a variety of reasons. For example, an in-line optical amplifier may fail which may cause a service disruption due to network traffic ceasing to travel through the in-line optical amplifier (e.g., a hard failure). In another example, an in-line amplifier may experience diminished performance (e.g., a soft failure) due to a failure of one or more pump lasers included in the amplifier that causes output power to decrease below a threshold. The soft failure may cause the signal quality of network traffic flowing through the network to degrade that could lead to a service disruption or could diminish a quality of service (QoS) associated with the network.

Usually, when a fault associated with a failed amplifier is detected, the network traffic on the network path, which may include tens or hundreds of channels, may be rerouted to an alternate path (e.g., a protection path), which may enable the optical network to continue to operate while minimizing downtime or disruption of network client services. However, while protection paths may, in some circumstances, reduce network downtime or disruption, utilizing a protection path while performing maintenance operations may nonetheless introduce new operational risks and/or undesirable affects on network operations, client services and operational costs. For example, utilizing a protection path, particularly during planned maintenance operations, may introduce constraints into the optical network that may affect performance, such as loss of optical path diversity (e.g., loss of link diversity and/or node diversity) due to the restriction in the number of available signal paths, which may also reduce available bandwidth for network traffic. Utilization of protection paths may also increase the likelihood of dual events (e.g., dual faults) due to the loss or reduction in available or redundant optical paths, which may increase the risk of network operations and/or reduced optical network reliability or performance. Additionally, performing maintenance operations using protection paths may be both costly and disruptive to network operations due to the need to schedule and coordinate maintenance events in advance to minimize impact on network services (e.g., due to shut downs on portions of the optical network); to inform and coordinate potential disruption of network services to clients; and to synchronize network maintenance crew schedules with those of local authorities and/or crews associated with sites (e.g., construction sites, locations of natural disasters, etc.) where maintenance may be performed.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

An implementation described herein may include systems and/or methods that provide for hot-swapping in-line optical amplifiers in an optical network (hereinafter referred to as a "network") that may enable the repair and/or replacement of an in-line optical amplifier without resorting to protection measures and/or experiencing a service disruption. Additionally, or alternatively, hot-swapping in-line optical amplifiers (hereinafter referred to collectively as "amplifiers" and individually as an "amplifier") in a network may permit conditions, associated with an amplifier, to be detected and responded to without experiencing service disruptions and/or resorting to protection measures (e.g., optical path rerouting by establishing a protection path, network device shut down, protection notification messaging, etc.). As described herein, an additional amplifier (e.g., a spare and/or temporary amplifier) may be installed at an amplifier node within the network to permit network traffic to be optically switched from a failed and/or degraded amplifier (e.g., associated with the amplifier node) to the additional amplifier installed in the amplifier node in a manner that does not cause a service disruption and/or trigger the protection measures.

In one example implementation, an amplifier may be replaced using an amplifier hot-swap operation. For example, an amplifier (e.g., an "old amplifier"), associated with an amplifier node in a network may be scheduled to be replaced. A maintenance technician, associated with the network, may install an additional amplifier (e.g., a "new amplifier") in the amplifier node that permits the network traffic traveling over a particular optical fiber to be optically switched from the old amplifier to the new amplifier within a period of time that is less than a threshold that causes a service disruption and/or triggers creation of a protection path.

In another example implementation, an amplifier may be repaired using an amplifier hot-swap operation. For example, in a manner similar that described above, a maintenance technician, associated with the network, may install an additional amplifier (e.g., a temporary amplifier) in an amplifier node that permits the network traffic to be optically switched from the amplifier to be repaired to the temporary amplifier within a period of time that is less than a threshold that causes a service disruption and/or triggers switching to a protection path. Additionally, or alternatively, the maintenance technician may perform the repair, which may permit the network traffic to be optically switched from the temporary amplifier to the repaired amplifier within the period of time.

In yet another example implementation, a condition associated with an amplifier may be detected (e.g., such as a hard failure or a soft failure), which may cause the network traffic to be automatically optically switched from the amplifier with which the condition is associated, to another amplifier (e.g., that was installed at a prior point in time) within a period of time that is less than a threshold that causes a service disruption and/or triggers switching to a protection path.

Figure 1:
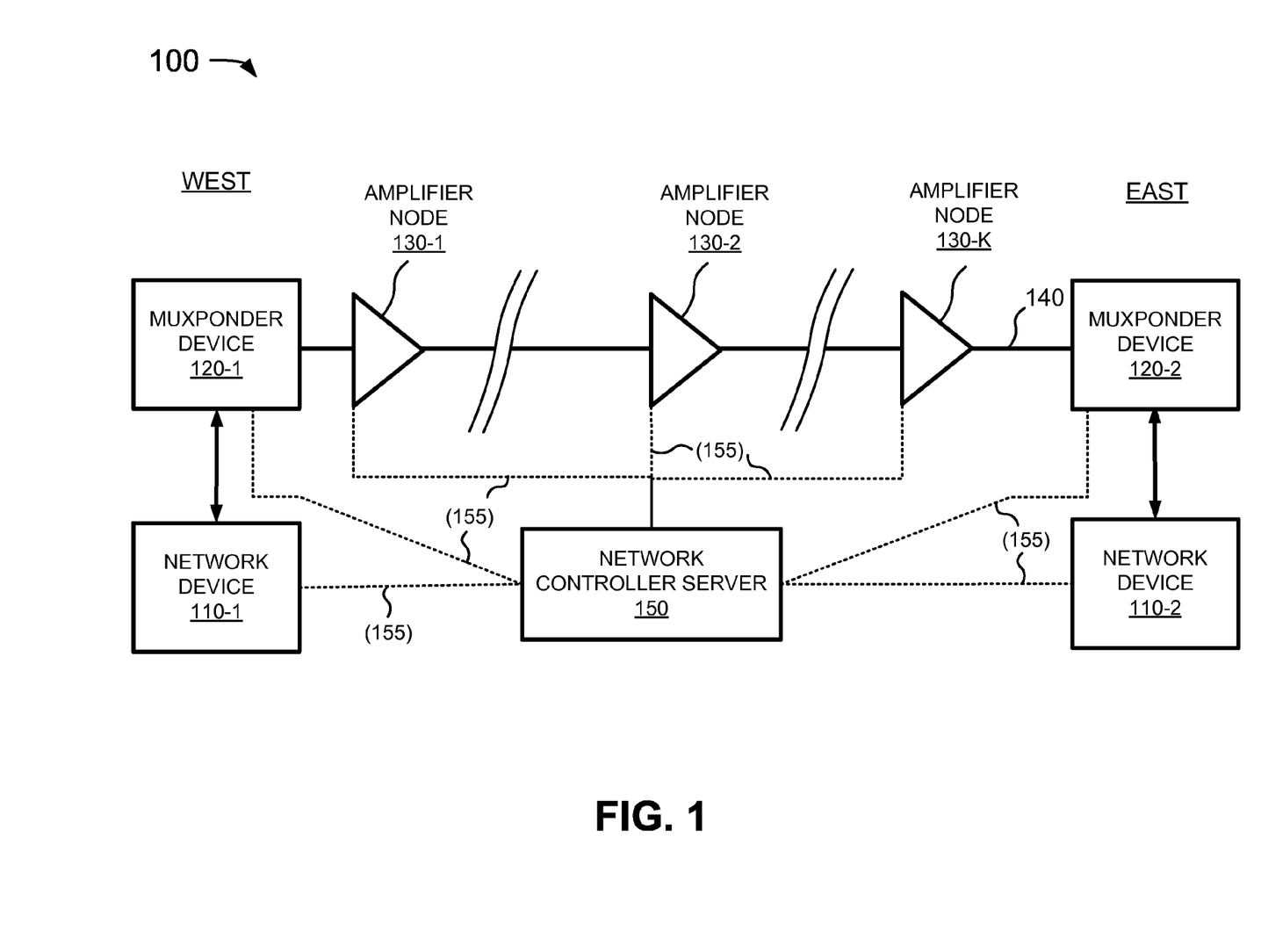
FIG. 1 is a block diagram of an example optical network in which systems and/or methods described herein may be implemented.

FIG. 1 is a block diagram of an example optical network 100 in which systems and/or methods described herein may be implemented. Optical network 100 may include a set of network devices 110-1 and 110-2 (referred to collectively as "network devices 110" and individually as "network device 110"), a set of muxponder devices 120-1 and 120-2 (referred to collectively as "muxponder devices 120" and individually as "muxponder device 120"), a group of amplifier nodes 130-1, . . . , 130-K (where K≧1) (hereinafter referred to collectively as "amplifier nodes 130" and individually as an "amplifier node 130"), a working fiber 140, a network controller server 150, and/or a set of control paths 155.

The number of devices and/or paths, illustrated in FIG. 1, is provided for explanatory purposes only. In practice, there may be additional devices and/or paths, fewer devices and/or paths, different devices and/or paths, or differently arranged devices and/or paths than illustrated in FIG. 1. Also, in some implementations, one or more of the devices of network 100 may perform one or more functions described as being performed by another one or more of the devices of network 100. For example, functions attributable to amplifier node 130 could be performed by muxponder device 120-1, muxponder device 120-2, and/or by another device, such as a photonic switch device and/or an amplifier device. Additionally, functions, described as being performed by network device 110-1, may be performed by muxponder device 120-1, and/or functions, described as being performed by network device 110-2, may be performed by muxponder device 120-2.

Optical network 100 may include one or more layers, such as a wavelength division multiplexing (WDM) layer (e.g., layer zero), an optical transport network (OTN) layer (e.g., layer one), an ethernet layer (e.g., layer two) and/or an internet protocol (IP) layer (e.g., layer three), etc. The WDM layer, OTN layer, ethernet layer and/or IP layer (e.g., layers 0-3, respectively) may provide particular functionalities pertinent to the operation, monitoring and control, transmission and/or signal content of optical network 100. For example, layer zero may include devices associated with optical signal generation and maintenance, such as muxponder device 120 and/or amplifier node 130, or one or more components of muxponder device 120 and/or amplifier node 130, such as lasers, multiplexers, demultiplexers, etc.

Layer one may include the OTN framework in which optical signals are transmitted over optical network 100 and may provide for signal routing, such as the establishment of one or more protection paths when a fault occurs. Additionally, layer one may provide optical channel provisioning, monitoring and control and/or optical signal maintenance and correction using a "digital wrapper" that provides preamble metadata for transport management (e.g., framing, supervisory functions for optical signal retiming, reshaping and regeneration) as well as postscript metadata for forward error correction (FEC) to reduce bit errors that may occur during transmission. Layer two may provide electrical transport for IP signals and/or other signals to and/or from the OTN layer and/or the IP layer. Layer three may include the IP layer that may integrate electrical functions, such as packet processing, routing, switching and/or multiplexing (electrical-to-optical signals) to produce optical signals that are provisioned on the optical network (e.g., via muxponder device 120) and may include devices, such as network device 110 and/or muxponder device 120.

Layers 0-3 of optical network 100 may collectively interact and/or communicate to perform functions and implementations described herein. Layers 0-3 may perform their respective functions utilizing one or more of the network devices described above (e.g., network device 110, muxponder device 120 and/or amplifier node 130, etc.) and/or additional network and/or optical devices. Also, in some implementations, one or more of the layers of optical network 100 may perform one or more functions described as being performed by another one or more of the layers of optical network 100. For example, functions attributable to the ethernet layer (e.g., layer two) could be performed by the IP layer (e.g., layer three) and/or by the OTN layer (e.g., layer one). Additionally, functions performed by the OTN layer, may be performed by the WDM layer (e.g., layer zero) and/or the ethernet layer (e.g., layer two). As discussed herein, functionalities and implementations of optical network 100 will be described in reference to a network and/or an optical device, or combinations of networks and/or optical devices (e.g., network device 110, muxponder device 120 and/or amplifier node 130, etc.) that may perform a particular function or series of functions attributable to one or more of the layers of optical network 100. It should be understood that references to network devices associated with optical network 100 are not mutually exclusive of the layers associated with optical network 100 (as described immediately above) and that there may be significant overlap to one or more corresponding layers.

Network device 110 may include one or more devices that switch, route, process, send, receive and/or provide information in a manner similar to that described herein. Network device 110 may communicate with muxponder device 120 to send and/or receive electrical signals containing information and/or data intended for operation and control of, and/or transmission over, optical network 100. Network device 110 may communicate with client networks and/or end user devices by processing and/or formatting signals, received from muxponder device 120, into protocols and/or standards that are understood and/or may be received by a client network and/or end user devices. Similarly, network device 110 may format and/or process signals received from client networks and/or end user devices for transmission to muxponder device 120 for transmission over optical network 100.

Muxponder device 120 may include one or more devices that receive, convert, process, switch, amplify, modulate, demodulate, multiplex, demultiplex, and/or transmit electrical and/or optical signals in a manner described herein. Muxponder device 120 may perform optical multiplexing operations by receiving a number of electrical signals and processing them into a single, multiplexed optical signal with multiple component wavelengths for transmission over an optical network. For example, muxponder device 120-1 may receive a number of electrical signals from network device 110-1 and may up-convert the received electrical signals into a number of modulated optical signals, each at a distinct optical wavelength. The modulated optical signals may be multiplexed into a single outgoing multi-wavelength optical signal (e.g., comprised of the component wavelengths of the individual optical signals), using wavelength division multiplexing techniques, for transmission over optical network 100, via working path 140 and/or some other network path.

Muxponder device 120 may also receive a multiplexed optical signal and may process the multiplexed optical signal into a number of modulated electrical signals for transmission over an electrical network. For example, muxponder device 120-2 may receive a multiplexed optical signal (e.g., containing many wavelengths) from amplifier node 130, via working path 140. Muxponder device 120-2 may demultiplex the received optical signal (e.g., using wavelength division demultiplexing techniques) into a number of optical signals, each at distinct wavelengths. The number of optical signals may be down-converted to a number of modulated electrical signals for transmission to network device 110-2.

Additionally, muxponder device 120 may perform optical amplification operations (e.g., amplify single and/or multi-wavelength optical signals), optical add-drop multiplexing operations (e.g., add and/or remove one or more signals from a multi-wavelength optical signal) and/or optical rerouting operations (e.g., reroute received optical signals to a protection path while maintenance is performed on a working path). To perform these operations, muxponder device 120 may contain various components, such as an optical multiplexer (to perform the optical multiplexing operations), an optical amplifier (to perform the optical amplification operations), an optical add-drop multiplexer (e.g., a remotely configurable add/drop multiplexer (ROADM) to perform the optical rerouting and/or optical add-drop multiplexing/demultiplexing operations), and/or an optical demultiplexer (to perform the optical demultiplexing operations).

Amplifier node 130 may include a device capable of increasing the strength and/or amplitude of a received optical signal, while maintaining the wavelength and/or bandwidth characteristics, information content and/or integrity of the optical signal. Additionally, amplifier node 130 may include a device capable of rapidly switching optical signals (e.g., received on an optical fiber associated with working path 140) between two or more amplifier devices associated with amplifier node 130. The switching may be performed in a manner such that network traffic (e.g., optical signals traveling via working path 140) is not interrupted and/or network protection measures are not triggered (e.g., protection notification messaging, optical path rerouting via protection path, device shut down, etc.), such as when a fault and/or cable break occurs.

In one implementation, as shown in FIG. 1, one or more amplifier nodes 130 may be spaced intermittently along working fiber 140 to increase the signal strength sufficiently to enable the optical signal to travel without disruption between muxponder device 120-1 and muxponder device 120-2.

Amplifier node 130 may support amplifier repair and/or replacement operations. For example, amplifier node 130 may enable maintenance operations by optically switching network traffic between amplifiers installed in amplifier node 130 without interrupting network 100 operations (e.g., by causing a fault and/or triggering protection measures within optical network 100 of FIG. 1. In another example implementation, amplifier node 130 may enable conditions, associated with amplifier node 130, to be detected and/or responded to in a manner that does not interrupt network 100 operations. For example, amplifier node 130 may detect a condition associated with an amplifier of amplifier node 130 and may optically switch traffic to another amplifier (e.g., a spare amplifier) installed within amplifier node 130 in a manner that does not disrupt network 100 operations.

Working path 140 may be a fiber optic cable or collection of fiber optic cables that interconnects muxponder device 120-1, muxponder device 120-2 and/or one or more amplifier nodes 130. Working path 140 may permit network traffic (e.g., contained within optical signals) to travel between muxponder devices 120 and amplifier nodes 130. In one implementation, as shown in FIG. 1, working path 140 may carry one-way traffic (e.g., from muxponder device 120-1 to muxponder device 120-2 via amplifier nodes 130). In another implementation, working path 140 may carry two-way traffic that includes the network traffic traveling from muxponder device 120-1 to muxponder device 120-2 via amplifier nodes 130 and network traffic traveling from muxponder device 120-2 to muxponder device 120-1 via other amplifier nodes 130 (e.g., not shown in FIG. 1).

Network controller server 150 may include a device, or collection of devices, that is capable of providing monitoring and control to network 100. Network controller server 150 may connect, via control path 155, to network devices 110, muxponder devices 120 and/or amplifier nodes 130. Control paths 155 may be wired, wireless, or a combination of wired and wireless connections that interconnect network controller server 150 to network devices 110, muxponder devices 120, amplifier node 130, and/or other devices associated with network 100. For example, network controller server 150 may send, via control path 155, an instruction to amplifier node 130 to optically switch network traffic from a particular amplifier to another amplifier associated with amplifier node 130. In another example, network controller server 150 may send notifications to network device 110, muxponder device 120 and/or amplifier node 130 to control operations. For example, network controller server 150 may send instructions directing one or more devices to shut down, not to shut down, to power up, to switch signals, not to switch signals, to ignore signal interruptions, etc. In another example, network controller server 150 may receive a notification that a fault has occurred and may send, via control paths 155, instructions to initiate protection measures to establish a protection path, to reroute network traffic, etc.

Figure 2:
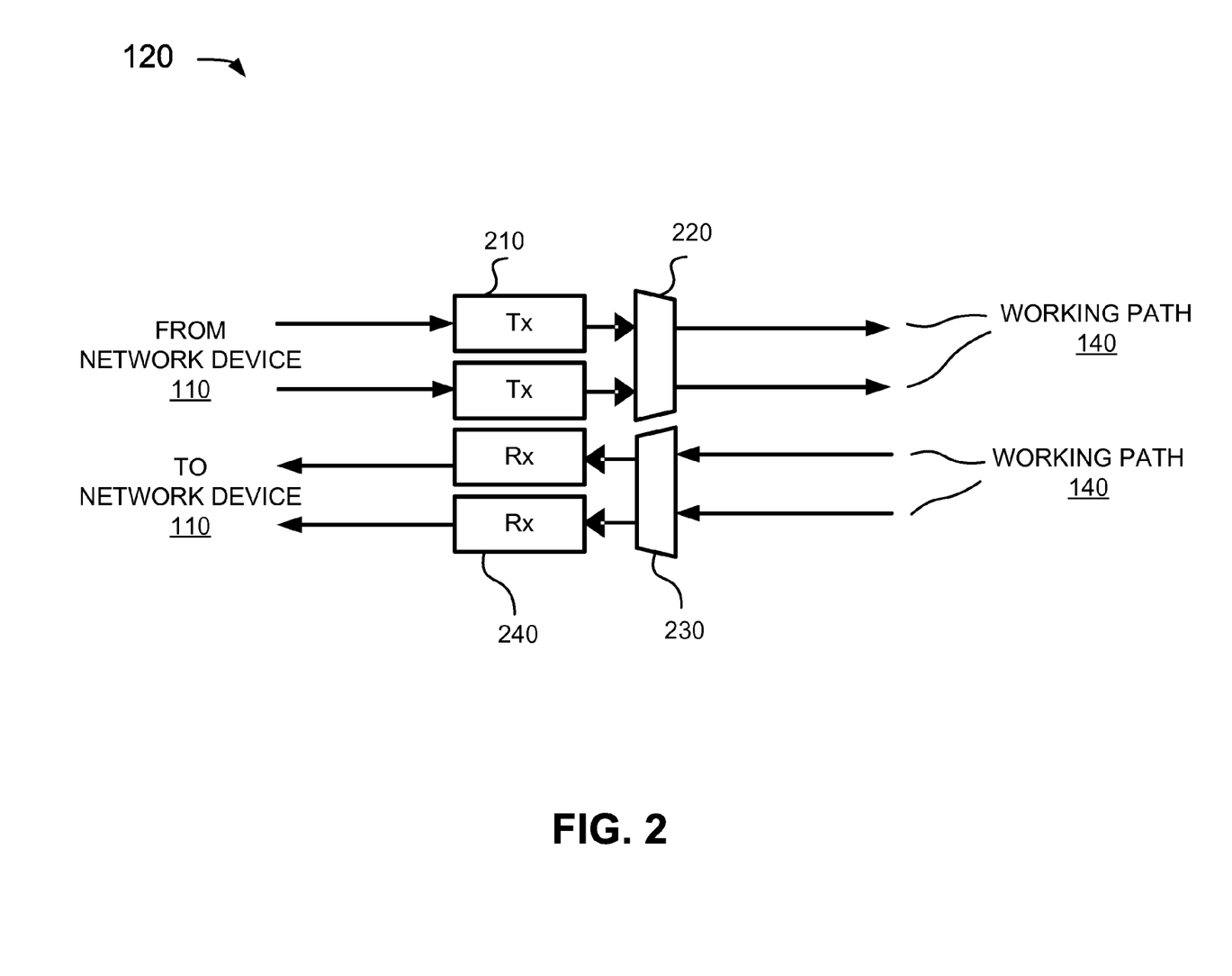
FIG. 2 is a diagram of example components of a muxponder device of FIG. 1.

FIG. 2 is a diagram of example components of muxponder device 120. As illustrated in FIG. 2, muxponder device 120 may include a bank of one or more transmitters (Tx) 210, one or more wavelength division multiplexers 220, one or more wavelength division demultiplexers 230 and/or a bank of one or more receivers (Rx) 240. The bank of transmitters (Tx) 210 may be connected to one or more wavelength division multiplexers 220, and one or more wavelength division demultiplexers 230 may be connected to the bank of one or more receivers (Rx) 240. Although FIG. 2 shows example components of muxponder device 120, in other implementations, muxponder device 120 may contain fewer components, additional components, different components, or differently arranged components than depicted in FIG. 2. Furthermore, in some implementations, one or more of the components of muxponder device 120 may perform one or more functions described as being performed by another one or more of the components of muxponder device 120. For example, one or more functions attributable to transmitter 210 could be performed by wavelength division multiplexer 220. In another example, one or more functions attributable to receiver 240 could be performed by wavelength division demultiplexer 230.

Transmitter 210 may generally be regarded as an optical source, and may include any device that uses an electrical signal, such as an electrical signal received from network device 110 to modulate and generate an optical signal at a given wavelength. In one implementation, transmitter 210 may include a laser, which may generate and transmit an optical signal at a particular wavelength and/or with a particular bandwidth. For example, a bank of transmitters 210 may output multiple spatially-separated optical signals (e.g., at distinctly different wavelengths), to wavelength division multiplexer 220.

Wavelength division multiplexer 220 may include any device that merges and/or combines separate optical input signals at unambiguously distinguishable wavelengths into a single multi-wavelength optical output signal with a particular bandwidth. In one implementation, wavelength division multiplexer 220 may receive multiple spatially-separate optical signals from transmitters 210, and may merge the multiple optical signals to produce a multi-wavelength outgoing signal for transmission to amplifier node 130 over working path 140.

Wavelength division demultiplexer 230 may include any device that receives an incoming optical signal that contains multiple wavelengths, such as a wavelength division multiplexed optical signal received from amplifier node 130 (e.g., via working path 140) and spatially separates the component wavelengths of the received optical signal, such that there are a number of separate outgoing optical signals at each component wavelength. In one implementation, demultiplexer 230 may receive a multi-wavelength optical signal from amplifier node 130 and may send a number of outgoing signals at component wavelengths to receivers 240.

Receiver 240 may include a device, such as a charged coupled device and/or photo detector that receives an incoming optical signal and uses the incoming optical signal to generate an outgoing modulated electrical signal. In one implementation, a bank of receivers 240, as shown in FIG. 2, may receive a number of incoming optical signals (e.g., from wavelength division demultiplexer 230) and may generate a number of corresponding modulated electrical signals (e.g., including video, text, data and/or telephonic signals) for transmission to network device 110.

Figure 3:
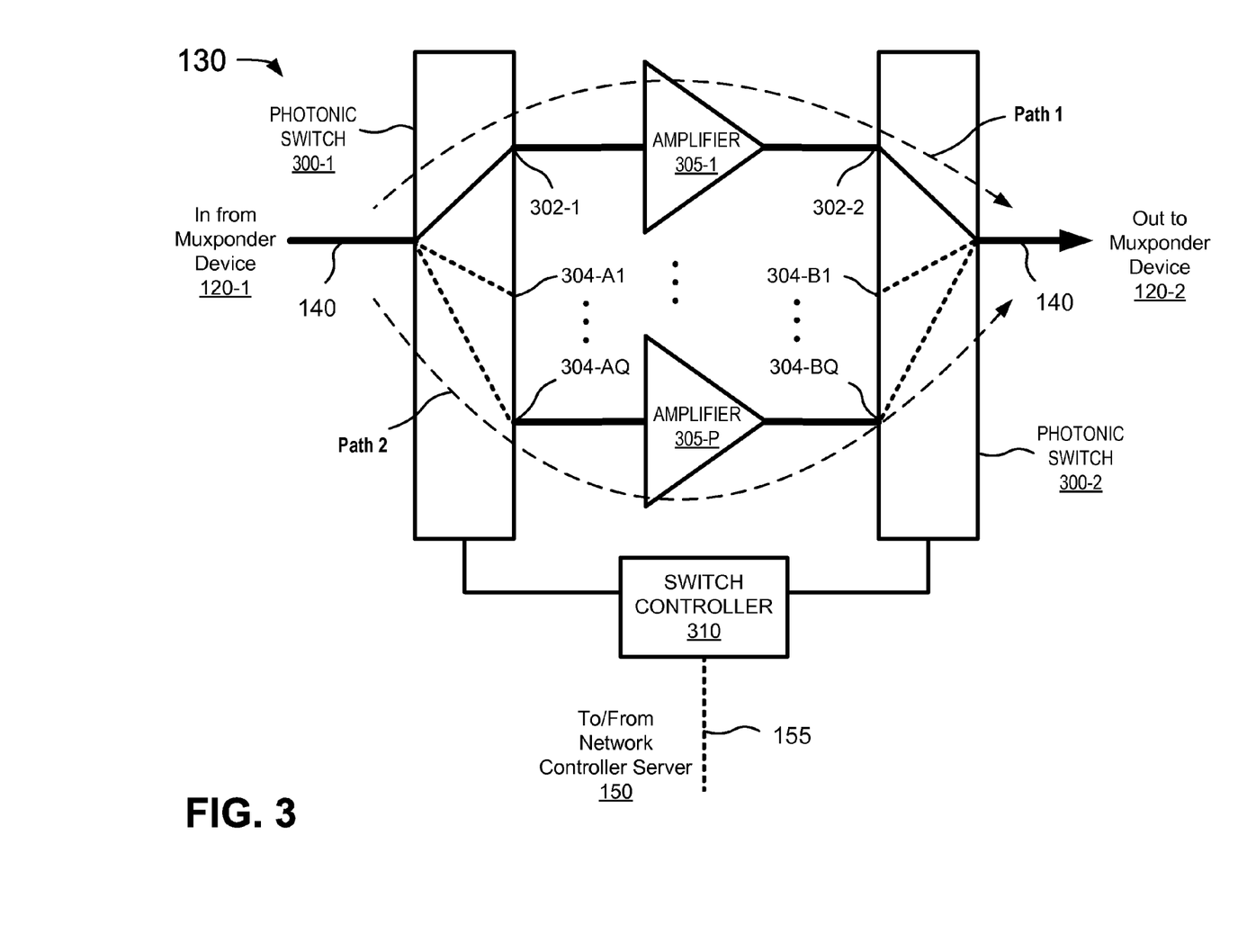
FIG. 3 is a diagram of example components of an amplifier node device of FIG. 1.

FIG. 3 is a diagram of example components of amplifier node 130. As illustrated in FIG. 3, amplifier node 130 may include a collection of components, such as a set of photonic switches 300-1 and 300-2 (hereinafter referred to collectively as "photonic switches 300" and individually as "photonic switch 300"), a group of amplifiers 305-1, . . . , 305-P (where P≧1) (hereinafter referred to collectively as "amplifiers 305" and individually as "amplifier 305"), and a switch controller 310. Although FIG. 3 shows example components of amplifier node 130, in other implementations, amplifier node 130 may contain fewer components, additional components, different components, or differently arranged components than depicted in FIG. 3. Furthermore, in some implementations, one or more of the components of amplifier node 130 may perform one or more functions described as being performed by another one or more of the components of amplifier node 130.

Photonic switch 300 may include a device or collection of devices that is capable of rapidly (e.g., faster than a threshold) switching network traffic from a particular port (e.g., on photonic switch 300) to another port on photonic switch 300. Photonic switch 300-1 may include a port 302-1 and/or a set of spare ports 304-A1, . . . , 304-AQ (where Q≧1). Photonic switch 300-2 may include a corresponding port 302-2 and/or a set of corresponding spare ports 304-B1, . . . , 304-BQ. Ports 302 may act as interfaces that permit photonic switches 300 to be interconnected with another device, such as amplifier device 305-1. For example, photonic switch 300-1 may receive traffic from muxponder device 120-1 via working path 140 and may send the network traffic to photonic switch 300-2 via amplifier 305-1 interconnected with photonic switch 300-1 and photonic switch 300-2 via ports 302-1 and 302-2, respectively (e.g., shown as path 1 in FIG. 3). Photonic switch 300-2 may receive the network traffic, via port 302-2 and may transmit the network traffic on working path 140 toward muxponder device 120-2.

Spare ports 304 may permit additional devices, such as amplifiers 305 to be installed in amplifier node 130. Additionally, or alternatively, spare ports 304 may act as an interface that permits additional devices, such as amplifiers 305, to be installed/interconnected between photonic switches 300-1 and 300-2. In one example, an additional device (e.g., amplifier 305-2—not shown in FIG. 3) can be installed between photonic switches 300 for each pair of corresponding spare ports (e.g., ports 304-A2 and ports 304-B2). In another example, as shown in FIG. 3, amplifier 305-P may be installed between photonic switch 300-1 and photonic switch 300-2 via corresponding spare ports 304-AQ and 304-BQ, respectively.

Photonic switches 300 may perform optical switching operations to permit amplifier 305 repair or replace operations to be conducted. Assume that a maintenance technician has installed one or more amplifiers 305 (e.g., amplifier 305-P) between photonic switches 300 via one or more corresponding pairs of spare ports 304 (e.g., spare ports 304-AQ and 304-BQ). Assume further that amplifier 305-1 is to be replaced by amplifier 305-P. For example, photonic switches 300 may receive an instruction from switch controller 310 to switch from ports 302-1 and 302-2 to spare ports 304-AQ and 304-BQ. The instruction may, for example, be received by each photonic switch 300 at approximately a same point in time that permits the switching operation, by photonic switch 300-1 and photonic switch 300-2, to be performed simultaneously. As a result of the switching operation, for example, the network traffic may be transmitted by photonic switch 300-1 to photonic switch 300-2 for transmission on working path 140 (e.g., to muxponder device 120-2) via spare ports 304-AQ and 304-BQ and/or amplifier 305-P. Additionally, or alternatively, the switching operation may be performed rapidly, such that a duration of the switching operation (e.g., as measured from the time that the instruction is received to the time that the optical signal is traveling via spare ports 304) is less than a particular threshold. The particular threshold may be associated with a time above which causes a fault to occur and/or to be detected in network 100 and/or which triggers protection measures to be established (e.g., protection notification messaging, optical signal path rerouting via a protection path, optical network device shut down, etc.).

Optical switching between amplifiers 305 may induce a minor optical perturbation and/or interruption of an optical signal of such short duration so as to be clearly distinguishable from a fault and/or to avoid triggering optical network protection measures (e.g., protection notification messaging, optical signal path rerouting via a protection path, optical network device shut down, etc.). For example, service disruption and/or optical network protection measures within network 100 may be avoided when the switching operation is performed in less time (e.g., less than approximately 20 ms) than the fault threshold that may trigger network protection measures (e.g., an optical signal interruption that lasts at least 100 ms).

In another example, a condition associated with amplifier 305 may be detected and the condition may be remedied by photonic switches 300. For example, amplifier 305 may experience a malfunction which renders amplifier 305 no longer able to receive and/or transmit network traffic, which, if not detected and/or remedied, may cause a fault to occur in network 100. In one example, photonic switches 300 may include a component that is capable of detecting and/or sensing optical signal strength, including a photo sensor and/or a photo detector. Photonic switch 300-2 may, for example, detect a loss of optical signal power at port 302-2 (e.g., when a quantity of power decreases below a threshold and/or a quantity of photons associated with the optical signal decrease below another threshold) and may send an indication to switch controller 310 that network traffic has ceased flowing via port 302-2. Photonic switches 300 may receive, from switch controller 310, a simultaneous instruction to perform a switching operation, in a manner described above. Photonic switches 300 may, in response to the instruction, perform the switching operation which may cause network traffic to flow via spare ports 304 and/or another amplifier 305 in a manner that avoids a fault and/or triggering protection measures within network 100.

Amplifier 305 may include a device that is capable of increasing the strength, and/or amplitude, of an incoming optical signal, while maintaining the wavelength and/or bandwidth characteristics, information content, and/or integrity of the incoming optical signal. Amplifier 305 may, for example, be connected to working path 140 via photonic switches 300 and may perform amplification operations on network traffic traveling on working path 140. In one example, amplifier 305-1 may receive network traffic from muxponder device 120-1 and working path 140 via photonic switch 300-1 (e.g., via port 302-1), may amplify the optical signal associated with the network traffic and may transmit the amplified optical signal to working path 140 and/or muxponder device 120-2. Amplifier 305 may detect when performance, associated with amplifier 305, has degraded, such as when output signal power has decreased below a threshold, and may send a notification to switch controller 310.

Switch controller 310 may include a processor, a microprocessor, or some form of hardware logic (e.g., an application specific integrated circuit (ASIC) or a field programmable gate array (FPGA)). For example, switch controller 310 may receive an instruction from network controller server 150 (e.g., via control path 155) to perform an operation to permit amplifier 305 to be repaired and/or replaced. Switch controller may receive the instruction and may generate another instruction for photonic switches 300 to perform a switching operation that includes switching network traffic from amplifier 305-1 to 305-P. Switch controller 310 may simultaneously send the other instruction to photonic switches 300-1 and 300-2 that causes photonic switches 300-1 and 300-2 to switch the network traffic to travel via amplifier 305-P (e.g., shown as path 2 in FIG. 3) in a manner that does not cause a fault and/or trigger protection measures in network 100.

In another example, switch controller 310 may receive a signal from photonic switch 300-2 indicating a reduction in signal power, associated with network traffic traveling via a port associated with photonic switch 300-2 (e.g., port 302-2, spare ports 304-B1, . . . , 304-BQ, etc.). Switch controller 310 may compare the signal power associated with network traffic traveling via the port associated with photonic switch 300-2 to signal power received, via working path 140, by photonic switch 300-1. In one example, if switch controller 310 detects a reduction in signal power, associated with a port that corresponds to photonic switch 300-2, that is comparable (e.g., is not disproportionate) to the reduction in signal power (e.g., less than a threshold) received by photonic switch 300-1, then switch controller 310 may determine that the loss in signal power is not attributable to amplifier node 130. Based on the determination, switch controller 310 may, for example, not cause an automatic switching operation to be performed.

In another example, if switch controller 310 detects a reduction in signal power, associated with the port that corresponds to photonic switch 300-2, that is not comparable (e.g., is disproportionate) to the reduction in signal power received by photonic switch 300-1 (e.g., greater than or equal to the threshold), then switch controller 310 may determine that the loss in signal power is attributable to amplifier node 130 (e.g., more particularly, amplifier 305 through which network traffic is traveling). In another example, switch controller 310 may determine a ratio of the signal power associated with photonic switch 300-2 to the signal power associated with photonic switch 300-1 to be less than another threshold. Based on the determination, switch controller 310 may simultaneously send an instruction to photonic switches 300-1 and 300-2 that causes photonic switches 300-1 and 300-2 to simultaneously switch the network traffic from the particular amplifier 305 to another amplifier 305. In another example implementation, switch controller 310 may receive a notification from amplifier 305 (via a control path not shown in FIG. 3) that may indicate that amplifier 305 has a condition. Based on the notification, switch controller 310 may send the simultaneous instruction to photonic switches 300-1 and 300-2 to cause photonic switches 300-1 and 300-2 to switch the network traffic to another amplifier 305.

Figure 4:
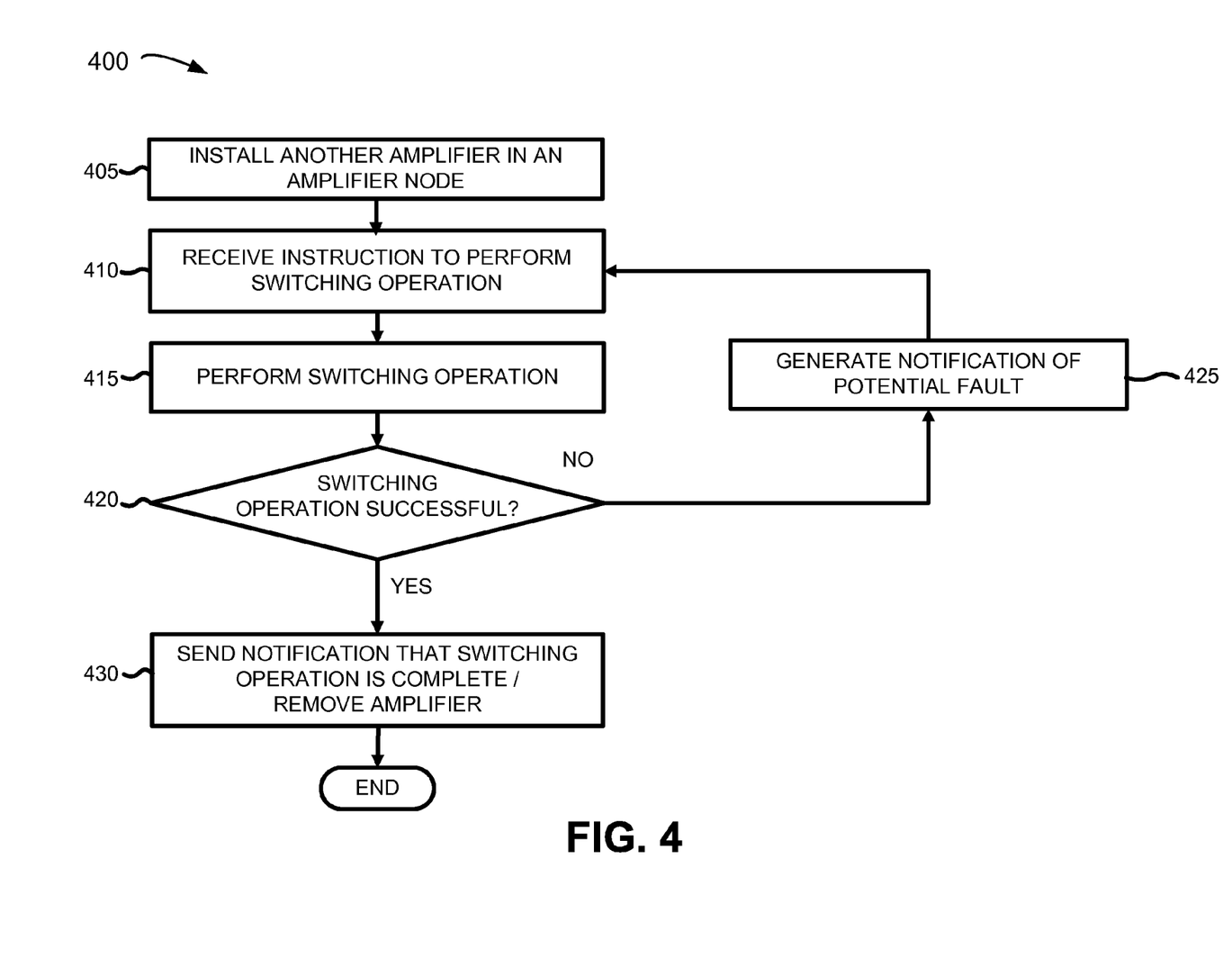
FIG. 4 is a flowchart of an example process for replacing an in-line optical amplifier using an in-line optical amplifier hot-swap operation.

FIG. 4 is a flowchart of an example process 400 for replacing amplifier 305 using an in-line amplifier hot-swap operation. In one implementation, some or all of process 400 may be performed by amplifier node 130. In another implementation, some or all of process 400 may be performed by one or more devices separate from, or in combination with, amplifier node 130.

As shown in FIG. 4, process 400 may include installing another amplifier in amplifier node 130 (block 405). Assume that an amplifier (e.g., amplifier 305-1), within amplifier node 130, is to be replaced (e.g., due to degraded performance, obsolescence, a defect, etc.). Assume further that amplifier 305-1 is installed between photonic switches 300-1 and 300-2 via ports 302-1 and 302-2, respectively. For example, a maintenance technician, associated with network 100, may install another amplifier 305 (e.g., amplifier 305-P) in amplifier node 130. The maintenance technician may, for example, install amplifier 305-P between photonic switches 300-1 and 300-2 via spare ports 304-AQ and 304-BQ, respectively, as described above (e.g., with respect to FIG. 3). The maintenance technician may send a notification to network controller server 150 indicating that amplifier switch 305-P has been installed.

As also shown in FIG. 4, process 400 may include receiving an instruction to perform a switching operation (block 410). For example, network controller server 150 may receive the notification and may send an instruction to amplifier node 130 to perform an amplifier hot-swap operation (e.g., to switch network traffic from amplifier 305-1 to amplifier 305-P). The instruction may include information associated with amplifier 305-1 (e.g., an amplifier 305-1 identifier and/or identifiers corresponding to ports 302-1 and/or 302-2), information associated with amplifier 305-P (e.g., an amplifier 305-P identifier and/or identifiers associated with spare ports 304-AQ and/or 304-BQ). In one example implementation, network controller server 150 may, for example, send a notification, via control paths 155, to network devices 110, muxponder devices 120, and/or other amplifier nodes 130 indicating that an amplifier hot-swap operation is to be performed and that perturbations in network traffic, during the amplifier hot-swap operation, are to be ignored (e.g., a fault condition is not to be detected and/or protection measures are not be invoked).

Amplifier node 130 may receive the instruction and may initiate a switching operation. In another example implementation, amplifier node 130 may receive the instruction and switch controller 310 may send an instruction to amplifier 305-P to power up (e.g., to warm up and/or ramp up amplifier 305-P). Additionally, or alternatively, switch controller 310 may, for example, monitor power consumption and/or output power associated with amplifier 305-P for a particular period of time and/or to determine that the power consumption and/or output power is greater than a threshold in order to ensure that amplifier 305-P is ready to receive, process, and/or transmit network traffic traveling via working path 140. In yet another example implementation, controller switch 310 may instruct photonic switch 300-1 to send a test signal to photonic switch 300-2, via amplifier 305-P, to verify that amplifier 305-P is ready to receive, process, and/or transmit network traffic. In still another example implementation, the instruction may not include information associated with amplifier 305-P and switch controller 310 may perform an operation to determine which other amplifiers 305 are installed on other spare ports 304 to which network traffic may be switched in order to replace amplifier 305-1.

As further shown in FIG. 4, process 400 may include performing the switching operation (block 415). For example, switch controller 310 may, in response to the instruction received from network controller server 150, send a simultaneous instruction to photonic switches 300-1 and 300-2 that may cause photonic switches 300-1 and 300-2 to simultaneously switch from amplifier 305-1 (e.g., associated with path 1 of FIG. 3) to amplifier 305-P (e.g., associated with path 2 of FIG. 3). Photonic switches 300-1 and 300-2 may receive the simultaneous instruction and may switch the network traffic from ports 302-1 and/or 302-2 associated with amplifier 305-1 to spare ports 304-AQ and/or 304-BQ associated with amplifier 305-P. The period of time during which the switching operation is performed may be less than a threshold associated with fault detection and/or triggering protection measures.

In another example implementation, switch controller 310 may receive the instruction from network controller server 150 and may cause the switching operation to be performed at a later point in time identified in the instruction.

As shown in FIG. 4, if the switching operation is not successful (block 420—NO), then process 400 may include generating a notification of a potential fault (block 425). For example, switch controller 310 may receive a signal from photonic switch 300-1 and/or 300-2 indicating that network traffic is not being received via spare port 304-AQ and/or 304-BQ, respectively. In one example implementation, switch controller 310 may send a notification to network controller server 150 that the switching operation was not successful and/or that a potential fault may have occurred. Network controller server 150 may receive the notification and may instruct network devices 110, muxponder devices 120, and/or other amplifier nodes 130 to initiation protection measures based on the potential fault. In another example implementation, switch controller 310 may retry the switching operation to determine whether network traffic can be switched to amplifier 305-P via spare ports 304-AQ and/or 304-BQ. In yet another example implementation, switch controller 310 may attempt to switch the network traffic to another amplifier 305 (e.g., other than amplifier 305-P) via other spare ports 304 (e.g., other than spare ports 304-AQ and/or 304-BQ). In still another example implementation, switch controller 310 may attempt to switch the network traffic back to amplifier 305-1 to avoid the potential fault.

As also shown in FIG. 4, if the switching operation is successful (block 420—YES), then process 400 may include sending a notification that the switching operation is complete and that an amplifier may be removed (block 425). For example, photonic switches 300-1 and 300-2 may switch the network traffic from amplifier 305-1 to amplifier 305-P and switch controller 310 may send a notification to network controller server 150 that amplifier 305-1 may be removed. Network controller server 150 may receive the notification and a maintenance technician, associated with network 100 may remove amplifier 305-1 from amplifier node 130, which may end process 400.

Figure 5:
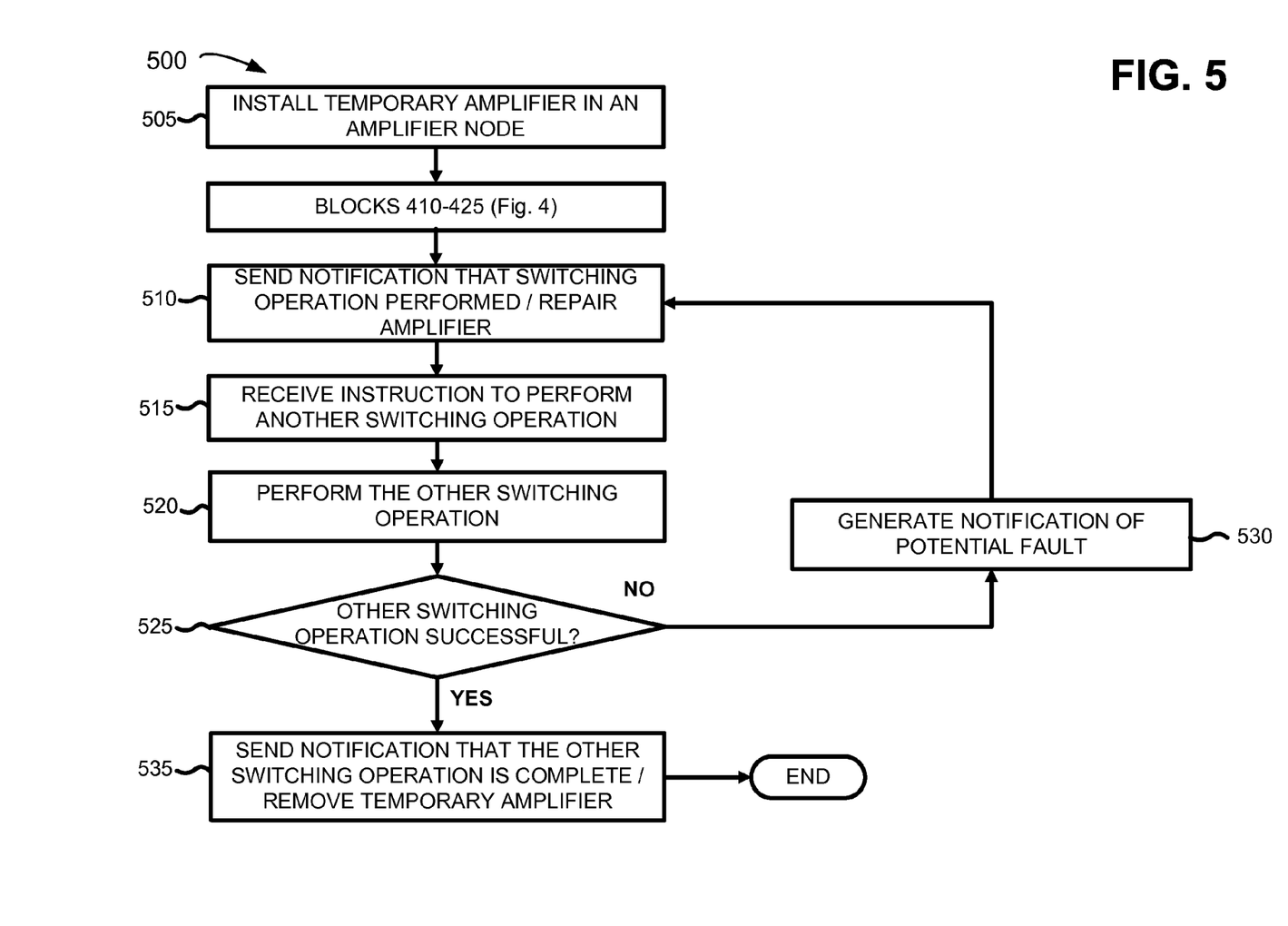
FIG. 5 is a flowchart of an example process for repairing an in-line amplifier using an in-line optical amplifier hot-swap operation.

FIG. 5 is a flowchart of an example process 500 for repairing amplifier 305 using an amplifier hot-swap operation. In one implementation, some or all of process 500 may be performed by amplifier node 130. In another implementation, some or all of process 500 may be performed by one or more devices separate from, or in combination with, amplifier node 130.

As shown in FIG. 5, process 500 may include installing a temporary amplifier in amplifier node 130 (block 405). Assume that an amplifier (e.g., amplifier 305-1), within amplifier node 130, has experienced a soft fail, such that one or more pump laser components within amplifier 305-1 has failed, which has caused the performance of amplifier 305-1 to degrade (e.g., output power and/or data rates have decreased below a threshold). For example, switch controller 310 may receive a notification from amplifier 305-1 (e.g., via a control path not shown in FIG. 3) indicating that a soft fail has occurred.

In another example, switch controller 310 may receive signals from photonic switches 300-1 and 300-2 that indicate power levels associated with network traffic being processed by photonic switches 300-1 and 300-2. Switch controller 310 may, for example, determine that the power level associated with network traffic being processed by photonic switch 300-1 is in a normal range (e.g., above a threshold), but the power level associated with network traffic being processed by photonic switch 300-2 is below the normal range (e.g., below another threshold). Based on the determination, switch controller 310 may send a notification to network controller server 150 indicating that amplifier 305-1 is in need of repair. Network controller server 150 may receive the notification and a maintenance technician, associated with network 100, may install a temporary amplifier 305 (e.g., amplifier 305-P) in amplifier node 130 if the temporary amplifier 305 is not already installed. The maintenance technician may, for example, install amplifier 305-P between photonic switches 300-1 and 300-2 via spare ports 304-AQ and 304-BQ, respectively, as described above (e.g., with respect to FIG. 3). The maintenance technician may send a notification to network controller server 150 indicating that amplifier switch 305-P has been installed.

A switching operation may be performed by amplifier node 130 in a manner similar to that described above (e.g., with respect to blocks 410-425 of FIG. 4). For example, network controller server 150 may receive the notification from the maintenance technician and may send an instruction to amplifier node 130, to perform an amplifier hot-swap operation (e.g., to switch network traffic from amplifier 305-1 to temporary amplifier 305-P). Switch controller 310, associated with amplifier node 130, may send a simultaneous instruction to photonic switches 300-1 and 300-2 that cause photonic switches 300-1 and 300-2 to switch the network traffic from amplifier 305-1 to amplifier 305-2.

As shown in FIG. 5, process 500 may include sending a notification that a switching operation was performed and an amplifier may be repaired (block 510). For example, switch controller 310 may send a notification to network controller server 150 indicating that network traffic has been switched to temporary amplifier 305-P and network controller server 150 may receive the notification. In response to the notification, a maintenance technician may repair amplifier 305-1 and may send a notification to network controller server 150 that amplifier 305-1 has been repaired and/or is ready to receive network traffic.

As also shown in FIG. 5, process 500 may include receiving another instruction to perform another switching operation (block 515). For example, network controller server 150 may receive the notification and may send another instruction to amplifier node 130 to perform another amplifier hot-swap operation (e.g., to switch network traffic from temporary amplifier 305-P back to amplifier 305-1). The instruction may include information associated with amplifier 305-1 to which traffic is to be switched (e.g., an amplifier 305-1 identifier and/or identifiers corresponding to ports 302-1 and/or 302-2), information associated with temporary amplifier 305-P from which network traffic is to be switched (e.g., an amplifier 305-P identifier and/or identifiers associated with spare ports 304-AQ and/or 304-BQ). In one example implementation, network controller server 150 may, in a manner similar to that described above (e.g., with respect to block 410 of FIG. 4), send a notification, via control paths 155, to network devices 110, muxponder devices 120, and/or other amplifier nodes 130 indicating that an amplifier hot-swap operation is to be performed and that perturbations in network traffic, during the amplifier hot-swap operation, are to be ignored (e.g., a fault conditions is not to be detected and/or protection measures are not be invoked).

Amplifier node 130 may receive the instruction and may initiate a switching operation. In another example implementation, amplifier node 130 may receive the instruction and switch controller 310 may, in a manner similar to that described above (e.g., with respect to block 410 of FIG. 4), send an instruction to amplifier 305-1 to power up (e.g., to warm up and/or ramp up amplifier 305-1). Additionally, or alternatively, switch controller 310 may, for example, monitor power consumption and/or output power associated with amplifier 305-1 for a particular period of time to determine that the power consumption and/or output power is greater than a threshold in order to ensure that amplifier 305-1 is ready to receive, process, and/or transmit network traffic traveling via working path 140. In yet another example implementation, controller switch 310 may instruct photonic switch 300-1 to send a test signal to photonic switch 300-2, via amplifier 305-1, to verify that amplifier 305-1 is ready to receive, process, and/or transmit network traffic.

As further shown in FIG. 5, process 500 may include performing the other switching operation (block 520). For example, switch controller 310 may, in response to the instruction received from network controller server 150, send another simultaneous instruction to photonic switches 300-1 and 300-2 that may cause photonic switches 300-1 and 300-2 to simultaneously switch from amplifier 305-P (e.g., associated with path 2 of FIG. 3) to amplifier 305-1 (e.g., associated with path 1 of FIG. 3). The period of time during which the switching operation is performed may, as described above (e.g., with respect to block 415 of FIG. 4) be less than a threshold associated with fault detection and/or triggering protection measures.

In another example implementation, switch controller 310 may receive the other instruction from network controller server 150 and may cause the other switching operation to be performed at a later point in time as identified in the instruction.

As shown in FIG. 5, if the other switching operation is not successful (block 525—NO), then process 500 may include generating a notification of a potential fault (block 530). For example, switch controller 310 may receive a signal from photonic switch 300-1 and/or 300-2 indicating that network traffic is not being received via port 302-1 and/or 302-2, respectively. In one example implementation, switch controller 310 may send a notification to network controller server 150 that the switching operation was not successful and/or that a potential fault may have occurred. Network controller server 150 may receive the notification and may instruct network devices 110, muxponder devices 120, and/or other amplifier nodes 130 to initiation protection measures based on the potential fault. In another example implementation, switch controller 310 may retry the switching operation to determine whether network traffic can be switched to amplifier 305-P via spare ports 304-AQ and/or 304-BQ. In yet another example implementation, switch controller 310 may attempt to switch the network traffic to another amplifier 305 (e.g., other than amplifier 305-P) via other spare ports 304 (e.g., other than spare ports 304-AQ and/or 304-BQ). In still another example implementation, switch controller 310 may attempt to switch the network traffic back to temporary amplifier 305-P to avoid the potential fault.

As also shown in FIG. 5, if the switching operation is successful (block 525—YES), then process 500 may include sending a notification that the other switching operation is complete and that a temporary amplifier may be removed (block 535). For example, photonic switches 300-1 and 300-2 may switch the network traffic from temporary amplifier 305-P to amplifier 305-1 and switch controller 3210 may send a notification to network controller server 150 that temporary amplifier 305-P may be removed. Network controller server 150 may receive the notification and a maintenance technician, associated with network 100 may remove temporary amplifier 305-P from amplifier node 130, which may end process 500.

Figure 6:
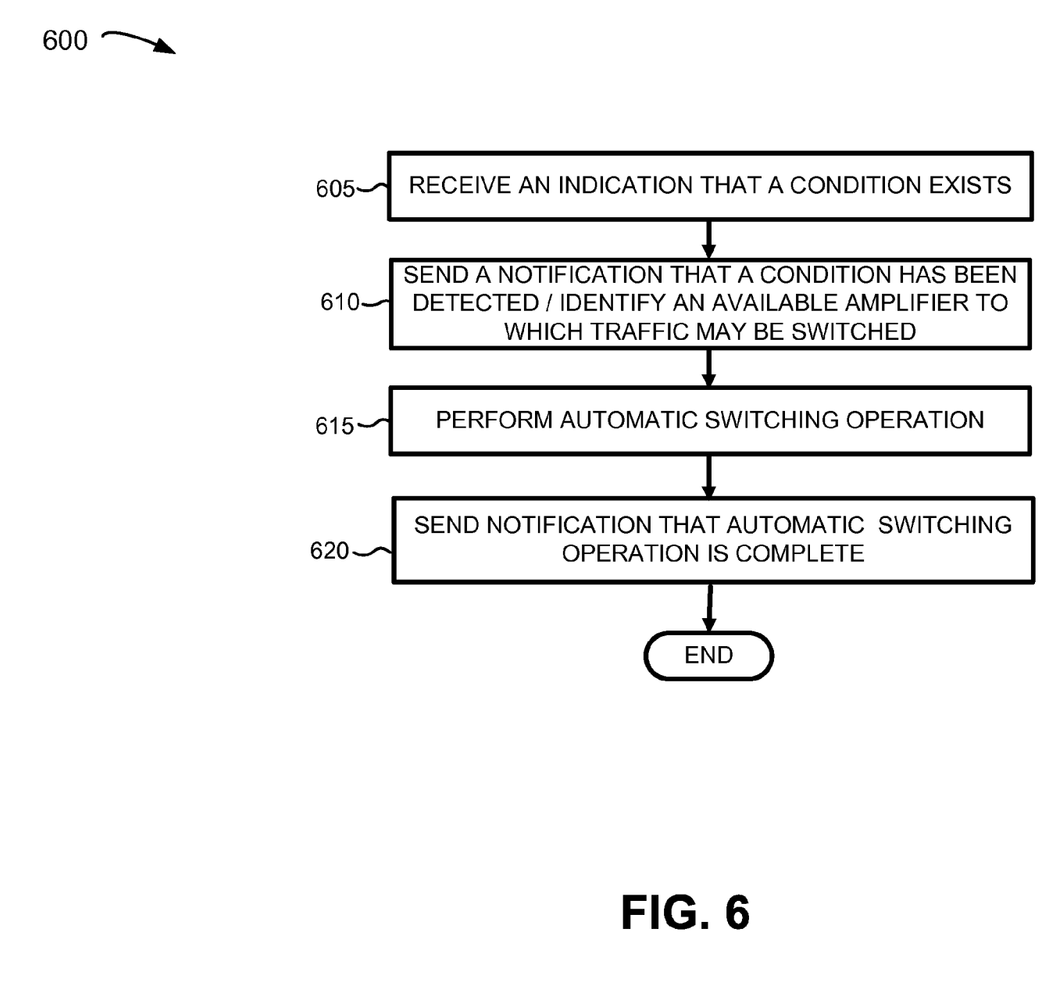
FIG. 6 is a flowchart of an example process for detecting and responding to a condition using an in-line optical amplifier hot-swap operation.

FIG. 6 is a flowchart of an example process 600 for detecting and responding to a condition, associated with an amplifier node, using an amplifier hot-swap operation. In one implementation, some or all of process 600 may be performed by amplifier node 130. In another implementation, some or all of process 600 may be performed by one or more devices separate from, or in combination with, amplifier node 130.

As shown in FIG. 6, process 600 may include receiving an indication that a condition exists (block 605). Assume that spare amplifier 305 (e.g., spare amplifier 305-P) has been pre-installed (e.g., at a prior point in time) between spare ports 304-AQ and 304-BQ of amplifier node 130. Assume further that network traffic associated with working path 140 is being received, processed, and/or transmitted by amplifier 305-1. In one example, switch controller 310 may receive a notification from amplifier 305-1 (e.g., via a control path not shown in FIG. 3) that a condition exists with respect to amplifier 305-1, such that amplifier 305-1 is experiencing a soft fail (e.g., as described above with respect to block 505 of FIG. 5). In another example, switch controller 310 may receive a signal from photonic switch 300-2 that indicates that there is a loss of power (e.g., greater than a threshold) detected at port 302-2 via which network traffic from amplifier 305-1 travels. In this example, switch controller 310 may receive another signal from photonic switch 300-1 that indicates that there has not been a loss of power detected with respect to network traffic being received from working path 140.

In yet another example, switch controller 310 may compare power levels indicated in the signals received from photonic switches 300-1 and 300-2. For example, switch controller 310 may determine that the ratio of power indicated in the signal received from photonic switch 300-1 (e.g., associated with the network traffic being received from working path 140) to the power as indicated in the signal received from photonic switch 300-2 (e.g., associated with network traffic received from amplifier 305-1) is below a particular threshold. When the ratio of power is determined to be less than the particular threshold, switch controller 310 may determine that amplifier 305-1 may not be sufficiently amplifying the network traffic.

As also shown in FIG. 6, process 600 may include sending a notification that a condition has been detected and identifying an available amplifier to which traffic may be switched (block 610). For example, switch controller 310 may determine that a condition, associated with amplifier node 130, exists and may send a notification to network controller server 150 indicating that the condition has been detected. Additionally, or alternatively, switch controller 310 may determine which spare port includes a spare amplifier 305. In one example, switch controller 310 may store the status (e.g., spare port 304 assignments, amplifier configuration information, state of readiness, etc.) of spare amplifiers 305 in a memory and may use the status to determine to which spare amplifier 305, network traffic is to be switched.

In the case where the condition is associated with a hard failure (e.g., when amplifier 305-1 has failed to a point that a fault may be triggered), switch controller 310 may, for example, determine which spare amplifiers 305 are warmed up and capable of receiving traffic. In the case where the condition is associated with a soft failure (e.g., when amplifier 305-1 performance has degraded below a threshold, but not to a point that a fault may be triggered), switch controller 310 may prepare a spare amplifier (e.g., spare amplifier 305-P) to receive, process, and/or transmit network traffic. For example, in a manner similar to that described above (e.g., with respect to block 410 of FIG. 4), switch controller 310 may send an instruction to spare amplifier 305-P to warm-up, may monitor power consumption and/or power output associated with spare amplifier 305-P, and/or may instruct photonic switch 300-1 to send a test signal to photonic switch 300-2, via amplifier 305-P, to ensure that amplifier 305-P is ready to receive, process, and/or transmit the network traffic.

As further shown in FIG. 6, process 600 may include performing an automatic switching operation (block 415). For example, switch controller 310 may, identify spare amplifier 305-P to which traffic is to be switched and may, in a manner similar to that described above (e.g., with respect to block 415 of FIG. 4) send a simultaneous instruction to photonic switches 300-1 and 300-2 that may cause photonic switches 300-1 and 300-2 to switch from amplifier 305-1 (e.g., associated with path 1 of FIG. 3) to amplifier 305-P (e.g., associated with path 2 of FIG. 3). Photonic switches 300-1 and 300-2 may receive the instruction and may simultaneously switch the network traffic from ports 302, associated with amplifier 305-1, to spare ports 304 associated with spare amplifier 305-P. The period of time during which the switching operation is performed may be less than a threshold associated with fault detection and/or triggering protection measures.

As also shown in FIG. 6, process 600 may include sending a notification that the automatic switching operation is complete (block 620). For example, photonic switches 300-1 and 300-2 may switch the network traffic from amplifier 305-1 to spare amplifier 305-P and switch controller 310 may send a notification to network controller server 150 that the automatic switching operation is complete, which may end process 600.

Implementations, described herein, may introduce photonic switch devices (e.g., that include spare ports) and/or additional amplifiers into an optical network that permit network traffic to be switched from an amplifier to a spare amplifier, during maintenance operations and/or when a condition associated with an amplifier is detected, without the need to use a protection path, thereby avoiding the pitfalls of using protection paths.

The foregoing description provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 4-6, the order of the blocks may be changed in other implementations. Also, non-dependent blocks may be performed in parallel.

Furthermore, while the embodiments disclosed have been presented as generally suitable for use in an optical network, the systems and methods disclosed herein are suitable for any fiber optic network, fiber network, fiber line, or link that includes one or more transmission spans, amplifier spans or hops.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. An amplifier node in an optical network, the amplifier node comprising:
    a first switch, connected to a working path, from which network traffic is received;
    a second switch, connected to the working path, to which the network traffic is transmitted as outgoing network traffic;
    two or more amplifiers that connect the first switch to the second switch,
        the network traffic traveling from the first switch to the second switch via a first amplifier of the two or more amplifiers; and
    a controller to:
        receive, from a server device associated with the optical network, a first instruction to switch the network traffic from the first amplifier to a second amplifier, of the two or more amplifiers, that enables the first amplifier to be repaired or removed in a manner that does not cause a fault in the working path,
        send a second instruction to the second amplifier to power up,
        send, based on the first instruction and to the first switch and the second switch, a third instruction to switch the network traffic from the first amplifier to the second amplifier after the second amplifier is powered up,
        receive, from the first switch or the second switch, an indication that the network traffic is traveling via the second amplifier, and
        send, to the server device, a notification that the first amplifier can be repaired or removed based on the indication that the network traffic is traveling via the second amplifier.

2. The amplifier node of claim 1, where the controller is further to:
 determine, after sending the second instruction, that the second amplifier is ready to receive the network traffic based on information indicating that power outputted by the second amplifier is greater than a threshold.

3. The amplifier node of claim 1, where switching the network traffic from the first amplifier to the second amplifier causes a perturbation in the network traffic that lasts for a period of time that is less than a threshold associated with another period of time that triggers the fault in the working path or switching to a protection path to reroute the network traffic.

4. The amplifier node of claim 1, where the controller is further to:
 receive, from the server device, a fourth instruction to switch the network traffic back to the first amplifier,
 send, based on the fourth instruction and to the first switch and the second switch, a fifth instruction to switch the network traffic from the second amplifier to the first amplifier,
 receive, from the first switch or the second switch, another indication that the network traffic is traveling via the first amplifier, and
 send, to the server device, another notification that the network traffic is traveling via the first amplifier based on the other indication.

5. The amplifier node of claim 1, where the controller is further to:
 receive, another indication from the second switch that the second amplifier has experienced a failure, and
 send, based on the other indication, a fourth instruction to the first switch and the second switch to switch the network traffic from the second amplifier to a third amplifier, of the two or more amplifiers.

6. The amplifier node of claim 5, where, when receiving the indication from the second switch, the controller is further to:
 identify the third amplifier based on information associated with a respective state of the two or more amplifiers,
  the information associated with the state of the two or more amplifiers including information that indicates that the third amplifier is installed and is able to receive the network traffic.

7. The amplifier node of claim 1, where the controller sends the second instruction simultaneously to the first amplifier and the second amplifier.

8. The amplifier node of claim 1,
 where the first instruction includes information identifying a particular point in time, and
 where, when performing the first switching operation, the controller is to:
  perform the first switching operation at the particular point in time.

9. A method comprising:
 receiving, by a controller of a device and from a particular amplifier of the device, an indication that a condition, associated with the particular amplifier, exists,
  the device including a first switch that receives network traffic from a first network path, a second switch that outputs the network traffic to a second network path, a plurality of amplifiers that interconnect the first switch and the second switch, and the controller,
  the controller being connected to the first switch, the second switch, and the plurality of amplifiers,
  the plurality of amplifiers including the particular amplifier,
  the network traffic traveling from the first switch to the second switch via the particular amplifier, and
  the condition corresponding to a power level, associated with the particular amplifier, that is below a threshold;
 sending, by the controller and to a server device, a notification indicating that the condition exists;
 receiving, by the controller and from the server device, a first instruction to switch the network traffic from the particular amplifier to another amplifier of the plurality of amplifiers;
 performing, by the controller and based on the first instruction, a switching operation that enables the network traffic to travel from the first switch to the second switch via the other amplifier in a manner that does not trigger a fault,
  the performing of the switching operation including:
   sending, to the first switch and the second switch, a second instruction to switch the network traffic from the particular amplifier to the other amplifier; and
 sending, by the controller and to the server device, a notification that the switching operation was performed or that the particular amplifier can be repaired or replaced.

10. The method of claim 9, where a period of time, during which the network traffic is switched from the particular amplifier to the other amplifier is less than a threshold associated with fault detection or triggering protection measures associated with the first network path or the second network path.

11. The method of claim 9, where performing the switching operation further includes:
 sending a third instruction to the other amplifier to power up.

12. The method of claim 11, where performing the switching operation further includes:
 sending a fourth instruction to the first switch to send a test signal to the second switch, via the other amplifier, to determine that the other amplifier is ready to receive the network traffic.

13. The method of claim 9, further comprising:
 receiving, from the second switch, a signal that indicates that a power output associated with the other amplifier is less than a first threshold;
 receiving, from the first switch, another signal that indicates that a power level associated with the network traffic received via the first network path is less than a second threshold; and
 determining that another condition, associated with the other amplifier, does not exist based on the power output being less than the first threshold and the power level being less than the second threshold.

14. The method of claim 9, further comprising:
 receiving, from the server device, a third instruction to switch the network traffic from the other amplifier to the particular amplifier;
 performing, by the controller and based on the third instruction, another switching operation that enables the network traffic to travel from the first switch to the second switch via the particular amplifier in the manner that does not trigger the fault; and
 sending, by the controller and to the server, another notification that the other switching operation was performed.

15. The method of claim 9,
where the first instruction includes information identifying a particular point in time, and
where performing the first switching operation includes:
performing the first switching operation at the particular point in time.

16. A device comprising:
a first switch, connected to a network path, from which network traffic is received;
a second switch, connected to the network path, to which the network traffic is transmitted as outgoing network traffic;
a first amplifier that connects the first switch and the second switch,
the network traffic traveling from the first switch to the second switch via the amplifier;
a second amplifier that connects the first switch and the second switch; and
a controller to:
receive, from a server device and via a control path, a first instruction to switch the network traffic from the first amplifier to the second amplifier,
the first instruction including information identifying a particular point in time,
perform, based on the first instruction and at the particular point in time, a first switching operation that enables the network traffic to travel, via the second amplifier, from the first switch to the second switch within a time period that is less than a second time period after which a fault in the network path is detected,
receive, from the server device and at a later point in time, a second instruction to switch the network traffic from the second amplifier to the first amplifier that has undergone repair,
perform, based on the second instruction, a second switching operation that enables the network traffic to travel, via the first amplifier, from the first switch to the second switch within the time period.

17. The device of claim 16, where, after performing the first switching operation, the controller is to:
receive, from the first switch or the second switch, an indication that the network traffic is traveling via the second amplifier, and
send, to the server device, a notification that the first amplifier can be repaired or replaced based on the indication that the network traffic is traveling via the second amplifier.

18. The device of claim 16, where, when performing the first switching operation, the controller is to:
send, to the second amplifier and based on the first instruction, a third instruction for the second amplifier to power up, and
monitor power output by the second amplifier to verify that the second amplifier is ready to receive the network traffic.

19. The device of claim 16, where, when performing the first switching operation, the controller is to:
send a third instruction to the first switch to switch the network traffic from the first amplifier to the second amplifier, and
send a fourth instruction to the second switch to switch the network traffic from the first amplifier to the second amplifier,
the fourth instruction being sent simultaneously with the third instruction.

20. The device of claim 16, where the controller is further to:
receive, from the first switch, a first signal that includes a first power level associated with the network traffic traveling through a port via which the second amplifier and the first switch are connected,
receive, a second signal from the second switch that includes a second power level associated with the network traffic traveling through another port via which the second amplifier and the second switch are connected, and
determine that a condition, associated with the second amplifier, exists based on the first power level and the second power level.

21. The device of claim 20, further comprising:
a third amplifier that connects the first switch and the second switch,
where, when determining that the condition exists, the controller is to:
determine a ratio of the second power level to the first power level, and
identify the condition when the ratio is less than a particular threshold,
the condition corresponding to degraded performance associated with the spare amplifier, and
where the controller is further to:
send a third instruction to the first switch and the second switch to switch the network traffic from the second amplifier to the third amplifier,
where the third instruction is sent in a simultaneous manner to the first switch and the second switch.

22. The device of claim 16, where the controller is further to:
send, after receiving the first instruction and to the second amplifier, a third instruction for the second amplifier to power up.

* * * * *